United States Patent
Adar et al.

(10) Patent No.: US 6,757,669 B1
(45) Date of Patent: Jun. 29, 2004

(54) SELF-CONTAINED INDEXING SYSTEM FOR AN INTRANET

(75) Inventors: Eytan Adar, Foster City, CA (US); Hinrich Schuetze, San Francisco, CA (US); Blake D. Ward, Los Gatos, CA (US)

(73) Assignee: Xerox Corporation, Stamford, CA (US)

( * ) Notice: Subject to any disclaimer, the term of this patent is extended or adjusted under 35 U.S.C. 154(b) by 0 days.

(21) Appl. No.: 09/493,277

(22) Filed: Jan. 28, 2000

(51) Int. Cl.[7] .............................................. G06F 17/30
(52) U.S. Cl. .................. 707/3; 707/2; 707/10; 707/101; 707/102
(58) Field of Search ................ 707/1, 2, 3, 4, 707/5, 6, 7, 8, 9, 10, 100, 101, 102, 103

(56) References Cited

U.S. PATENT DOCUMENTS

| | | | |
|---|---|---|---|
| 5,675,791 A | * 10/1997 | Bhide et al. | 707/205 |
| 5,799,151 A | * 8/1998 | Hoffer | 709/204 |
| 6,008,805 A | * 12/1999 | Land et al. | 345/744 |
| 6,012,088 A | * 1/2000 | Li et al. | 709/219 |
| 6,029,196 A | * 2/2000 | Lenz | 709/221 |
| 6,189,026 B1 | * 2/2001 | Birrel et al. | 709/206 |
| 6,192,364 B1 | * 2/2001 | Baclawski | 707/10 |
| 6,295,530 B1 | * 9/2001 | Ritchie et al. | 707/4 |
| 6,336,116 B1 | * 1/2002 | Brown et al. | 707/10 |
| 6,360,260 B1 | * 3/2002 | Compliment et al. | 709/224 |
| 6,424,654 B1 | * 7/2002 | Daizo | 370/401 |
| 6,424,966 B1 | * 7/2002 | Meyerzon et al. | 707/3 |
| 6,480,853 B1 | * 11/2002 | Jain | 707/10 |

OTHER PUBLICATIONS

Network Appliance—Network Storag . . . ing Solutions (UNIX, Windows, Web), May 5, 2000, http://www.netapps.com/.

"The Community Resource for Jini™", www.jini.org Home Page, May 5, 2000, http://www.jini.org/.

Welcome to the Universal Plug and Play Forum, May 5, 2000, http://www.upnp.org/.

\* cited by examiner

Primary Examiner—Shahid Alam
Assistant Examiner—Isaac Woo
(74) Attorney, Agent, or Firm—Oliff & Berridge, PLC

(57) ABSTRACT

This invention provides a device that can be plugged into an intranet and offers searchable index functionality of that intranet without requiring information about system configuration or administration.

19 Claims, 6 Drawing Sheets

SELF-CONTAINED INDEXING SYSTEM FOR AN INTRANET

BACKGROUND OF THE INVENTION

1. Field of Invention

The present invention relates to a self-contained device for searching or indexing an intranet and a method for installing the same.

2. Description of Related Art

Although searching and indexing an intranet for intranet management is conventionally known, the ability to install and configure devices that perform such searching and indexing requires a high level of skill and effort. Most often, such devices must be installed and configured by only the most sophisticated of operators. Additionally, these devices when installed and configured are extremely expensive because the devices and the incorporated software are often custom. Therefore, the software is developed for the particular intranet on which it will be used.

SUMMARY OF THE INVENTION

This invention provides a device that can be plugged into an intranet and offer searchable index functionality of that intranet without requiring information about the intranet system configuration or administration.

The exemplary embodiments of the invention provide searchable index functionality with improved simplicity. The devices and methods according to the exemplary embodiments of the invention provide a search service that requires no complicated setup or search-specific skills. Assuming a company has a web-presence and someone who maintains its web server sets up the device, installation should take no more than fifteen minutes, following a simple set of instructions.

Additionally, the device according to the exemplary embodiments of the invention is relatively low in cost due to bundling of software and hardware and volume discounts. The exemplary embodiments of the invention simplify setup for full-text search of an intranet to purchasing and connecting a device to an intranet.

The exemplary embodiments of the invention lower the barriers to setting up an intranet search by bundling the software and hardware into a "black box" device that can be connected to the intranet by an operator.

Additionally, the exemplary embodiments provide for auto-configuration of the device into the intranet to be searched and indexed.

These, and other features and advantages of this invention are described in or are apparent from the following detailed description of the system and methods according to this invention.

BRIEF DESCRIPTION OF THE DRAWINGS

The benefits of the present invention will be readily appreciated and understood from consideration of the following detailed description of the exemplary embodiments of this invention, when taken with the accompanying drawings, in which same numbered elements are identical and.

DETAILED DESCRIPTION OF PREFERRED EMBODIMENTS

Figure 1:
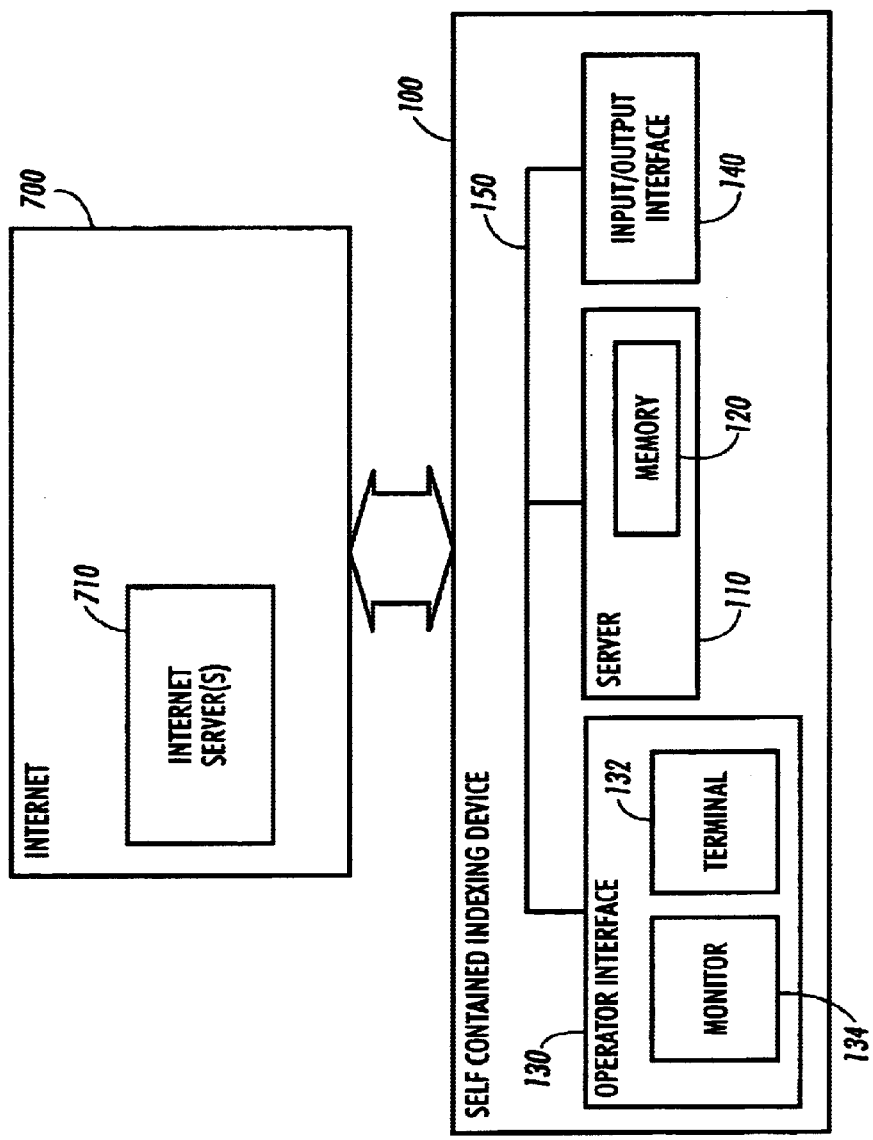
FIG. 1 illustrates a self-contained device for searching and indexing an intranet in accordance with a first exemplary embodiment of the invention.

As shown in FIG. 1, the self-contained device 100 communicates with an intranet 700 to perform searchable indexing. The intranet 700 is administered by an one or more intranet servers 710. The self-contained device 100 includes a server 110, including memory 120, an operator interface 130, and an input/output interface 140 operationally coupled together using a data/control bus 150. The operator interface 130 is used for communication between the device 100 and a device operator who is installing or maintaining the device 100. The operator interface 130 preferably includes an exposed operator terminal 132 and a monitor 134 for outputting information to and receiving input from the operator. The operator interface 130 allows specification of the device name, device IP address, a list of servers that is to be crawled, indexing parameters, e.g., indexing frequency, search parameters, e.g., default boolean or vector space parameters, etc. Alternatively, the operator interface 130 may be realized using either a custom protocol or an established Internet protocol, e.g., Jini, SLP, CORBA, DCOM, etc.

The input/output interface 140 is used for communication between the device 100 and the intranet 700. The input/output interface 140 also allows connection with the device 100 from outside the intranet, e.g., via telnet.

The memory 120 stores algorithms that enable the device 100 to crawl and index the intranet 700. All algorithms included in memory 120 are installed prior to installing the device 100 communicating with the intranet 700 through the input/output interface 140. Memory 120 may include a significant amount of available memory. For example, memory 120 may include a sufficient amount of disk storage to be able to hold an index of a desired size.

A method for installing the self-contained indexing device 100 designed according to a first exemplary embodiment will now be explained with reference to FIG. 2. The method begins in step S200 and proceeds to step S210. In step S210, the searching and indexing device is connected to the intranet through an input/output interface. The method proceeds to step S220. In step S220, a device server within the searching and indexing device copies a pre-made cgi-script or writes a custom cgi-script in a cgi-bin directory of a server of the intranet through the input/output interface. Control then proceeds to step S230.

For example, in step S220, the device may connect to the intranet by running a client "script" that sits on an intranet server and connects to the device for search results. Assuming the device has a set IP address a cgi-script can be made to run on a server in the intranet, sending searching and indexing queries to the device and formatting the results for transmission back to a client somewhere on the intranet. Alternatively, the device 100 may connect to the intranet by running a Jini/SLP/UPnP service on the device 100 that responds to broadcasted service requests from a client. In this scenario the script does not need to use a pre-defined location for the device. Rather, the script can discover the location of the device 100 on the intranet by means of an established discovery protocol. Examples of this are Jini, SLP and UpnP.

In step S230, specific parameters, e.g., name, IP address, of the servers within the intranet to be crawled and indexing and search parameters are set by an operator installing the searching and indexing device. Control then proceeds to step S240, in which the method ends.

A significant requirement of the searching and indexing device is that Internet protocol (IP) addressability be easily established within the intranet to which the device is being installed. IP addressability for the self-contained indexing devices designed in accordance with the exemplary embodiments may be performed in a variety of ways.

For example, IP addressability may be set up by the operator setting the IP address via the operator interface during installation of the device into the intranet. However, such an option is appropriate when more technically-sophisticated operators are installing the indexing device and allows for more detailed configuration of the device.

Alternatively, IP addressability may be set up by hard-coding the IP address into searching and indexing device prior to installation. In such a situation, the work of configuring the self-contained indexing devices is performed during manufacture of the device. Therefore, the work associated with setting up the IP address is shifted away from an operator performing installation.

Also, IP addressability may be set up using dynamic host configuration protocol (DHCP), or AutoIP. Using DHCP or AutoIP allows a device to pick it's own IP address within the intranet 700.

Figure 3:
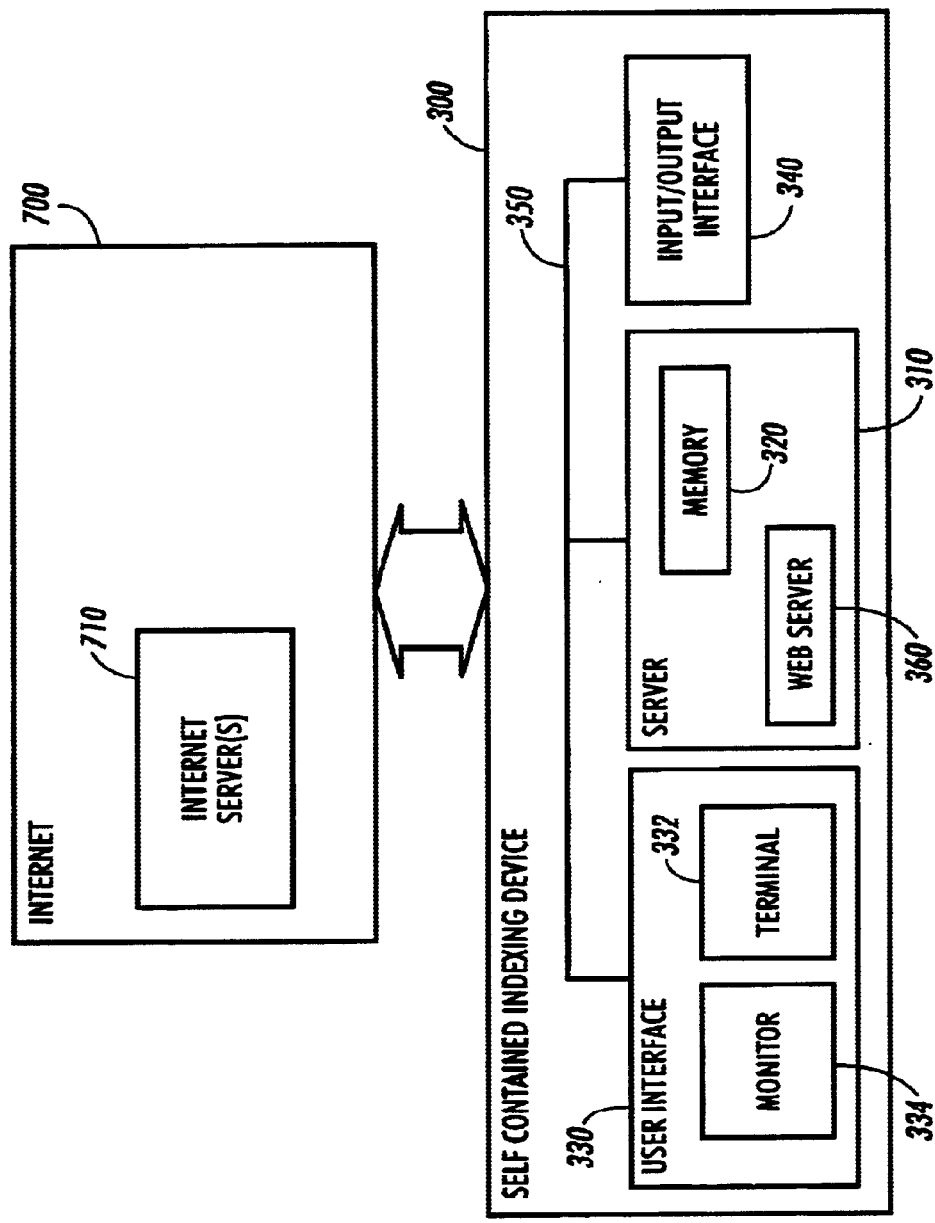
FIG. 3 illustrates a self-contained device for searching and indexing an intranet in accordance with a second exemplary embodiment of the invention.

According to a second exemplary embodiment of the invention, as illustrated in FIG. 3, the self-contained indexing device 300 includes all the components of the device 100 of the first exemplary embodiment illustrated in FIG. 1, labeled with similar reference numbers, and also includes a web server 360 running on device server 310. In the second exemplary embodiment, the device 300 is assigned a permanent IP address, which allows the device 300 to run a simple web server 360 that includes a form for entering a query, and the necessary logic to process that query. The memory 320 stores algorithms that enable the web server 360 to search the intranet. In this configuration, the intranet server 710 includes a link to the device's web server 360. As a result, the second exemplary embodiment requires minimal configuration for installation.

Figure 4:
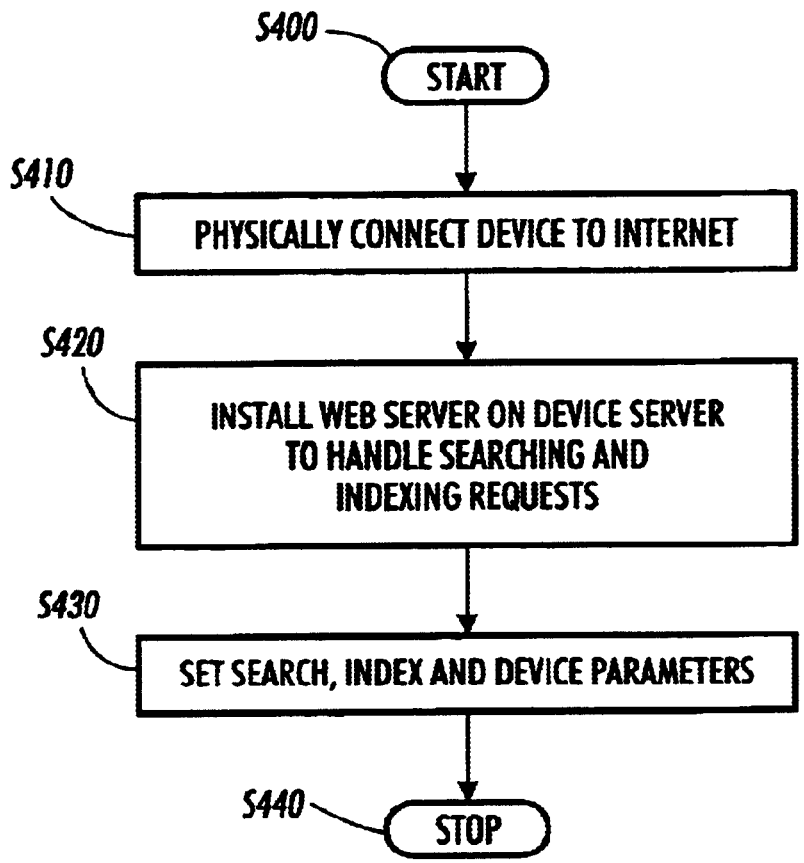
FIG. 4 illustrates a method for installing the searching and indexing device in an intranet according to the second exemplary embodiment of the invention.

A method for installing the self-contained indexing device designed according to the second exemplary embodiment will now be explained with reference to FIG. 4. The method begins in step S400 and proceeds to step S410. In step S410, the searching and indexing device is connected to the intranet through an input/output interface. The method proceeds to step S420. In step S420, the web server on the device server is installed to handle searching and indexing requests rather than having an intranet server handle such requests as in the first embodiment. Control then proceeds to step S430.

In step S430, specific parameters, e.g., name, IP address, of the servers within the intranet to be crawled and indexing and search parameters are set by an operator installing the searching and indexing device. Control then proceeds to step S440, in which the method ends.

According to the second exemplary embodiment, the intranet server can be made to point to the device's internal web server. If a list of intranet servers to be crawled is not specified during installation in step S430, the device crawls a local block of addresses, trying to connect to a default intranet server port on each of the servers.

Figure 5:
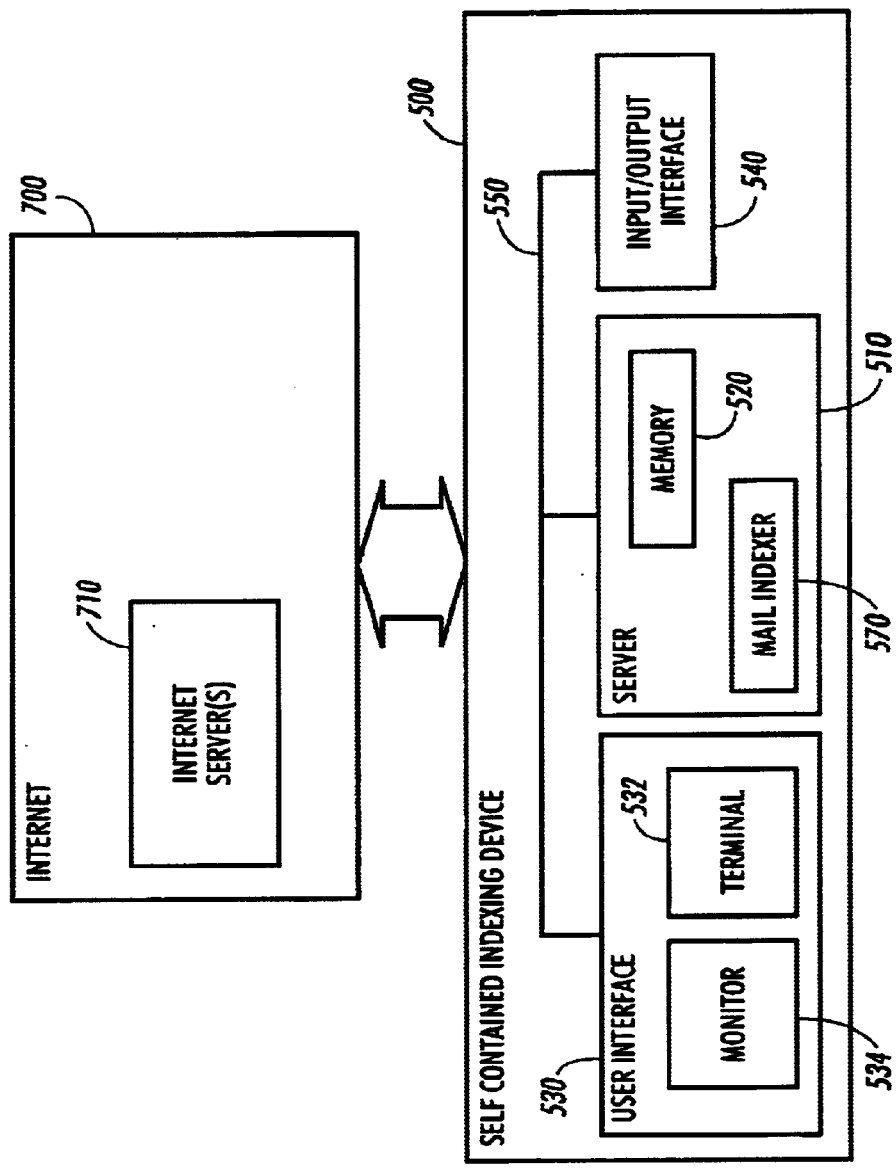
FIG. 5 illustrates a first variation of the self-contained device for searching and indexing an intranet in accordance with the first exemplary embodiment of the invention.

In one variation of the exemplary embodiments, the self-contained searching and indexing device may also act as a simple mail indexer as shown in FIG. 5. As illustrated, the self-contained indexing device 500 includes all the components of the device 100 of the first exemplary embodiment, labeled with similar reference numbers. However, the server 510 also includes a simple mail indexer 570 that is capable of receiving mail via the input/output interface 540. Mail aimed at a specific inbox on the device 500 is indexed. For example, ajinioperators-index account is created on the device 500, e.g., with hostname indexbox.parc.xerox.com. An administrator of the jinioperators@parc.xerox.com could then add the recipient jinioperators-index@indexbox.parc.xerox.com. Any mail aimed at jinioperators@parc would also be forwarded to jinioperators-index@indexbox for archiving and or indexing.

Figure 6:
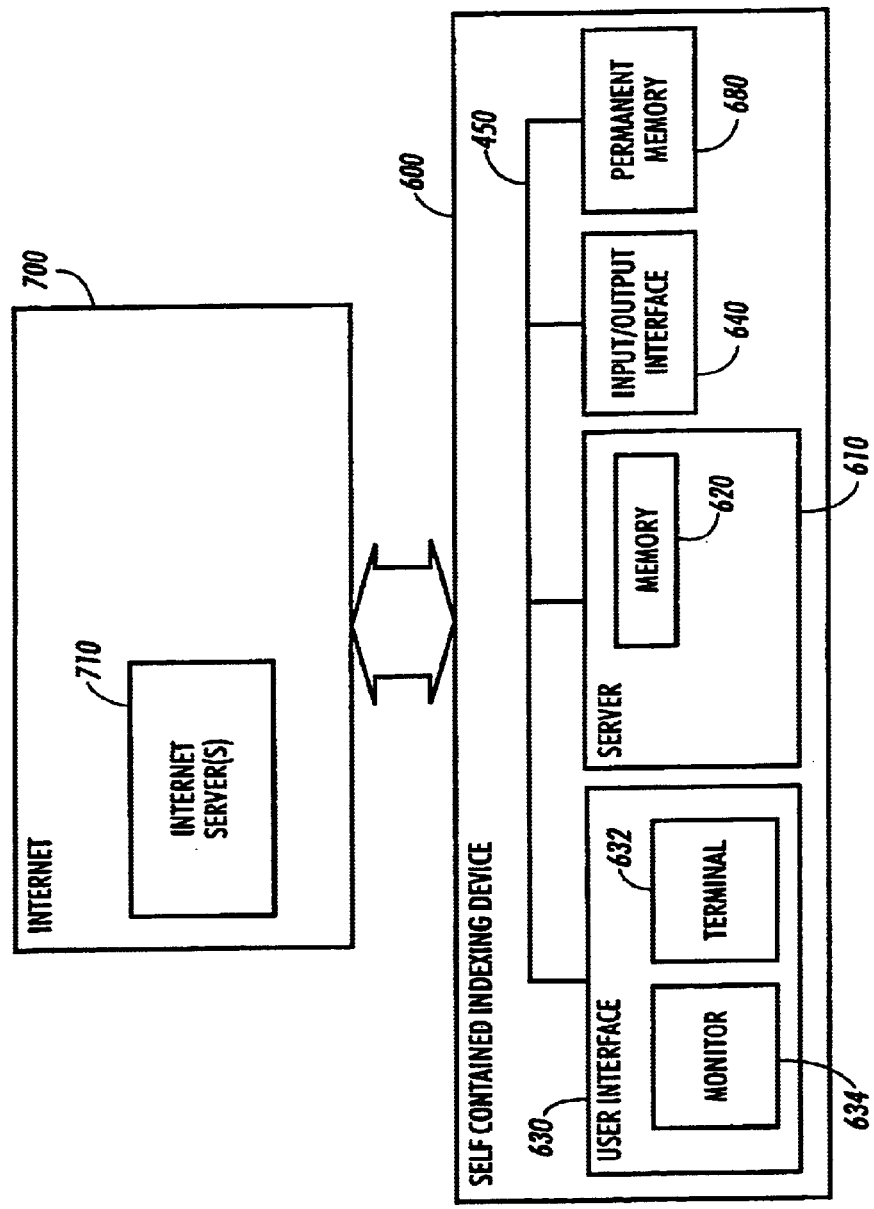
FIG. 6 illustrates a second variation of the self-contained device for searching and indexing an intranet in accordance with the first exemplary embodiment of the invention.

In a second variation of the exemplary embodiments, the self-contained searching and indexing device may also act as an intranet archive as illustrated in FIG. 6. Therefore, the self-contained indexing device 600 includes all the components of the device 100 of the first exemplary embodiment, labeled with similar reference numbers and also includes a large permanent memory device 680. Such a device 700 not only indexes the various pieces of information on the intranet but also maintains an archive of all found documents in the memory 680. The contents of memory 680 serve as both backup and archive and may have other applications as well. Memory device 680 may be any now known or later developed mechanism for storing data.

While this invention has been described in conjunction with the specific embodiments outlines above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

Figure 2:
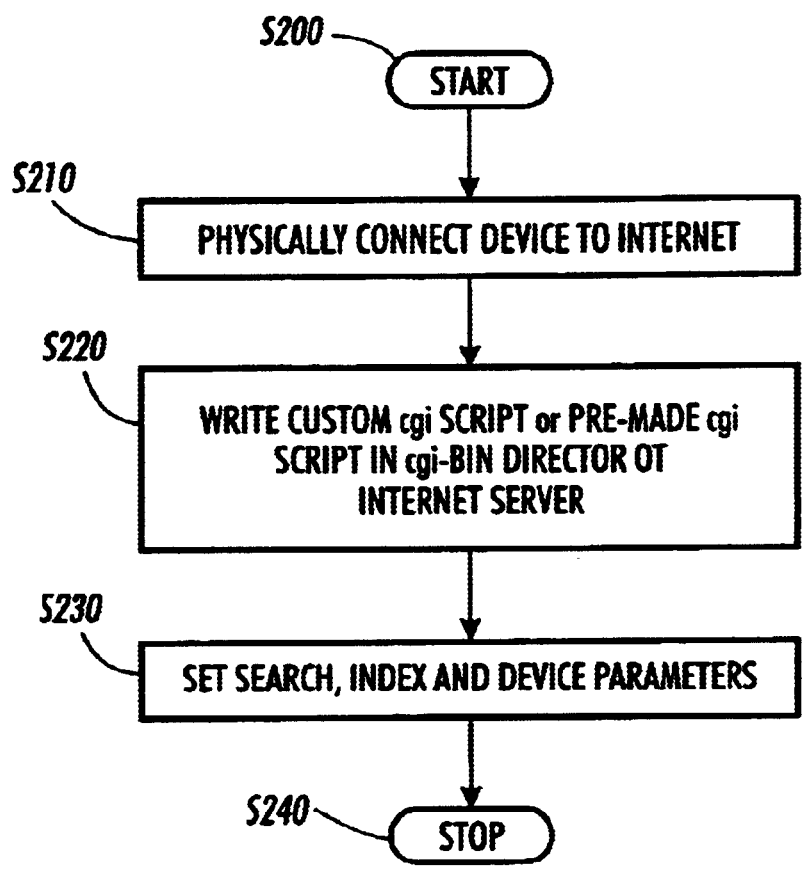
FIG. 2 illustrates a method for installing the searching and indexing device in an intranet according to the first exemplary embodiment of the invention.

For example, although the method of installing the searching and indexing device illustrated in FIG. 2 indicated that searching and indexing parameters are set by an operator installing the device, it is foreseeable that such parameters may alternatively be set during manufacture of the device. This would beneficially eliminate a requirement have an elevated level of skill to install the device.

Additionally, although the figures and specification describe the operator interface 130 as being resident within the self-contained indexing device 100, it is foreseeable that the self-contained indexing device 100 may be remotely operated and configured through, for example, a network. Therefore, it should be appreciated that the operator interface 130 may be omitted in such situations when operation and configuration of the self-contained indexing device 100 may be performed through the input/output interface 140.

What is claimed is:

1. A self-contained device that performs searchable indexing, the device comprising:

a server having a memory that stores instructions that allows automatic configuration of the device to enable the self-contained device to crawl and index an intranet to provide a searchable index of the content accessible through the intranet, without requiring information about the intranet configuration and administration;

an operator interface coupled to the server, the operator interface receiving input from a device operator and transmitting output to the device operator; and an input/output interface coupled to the server and the operator interface, the input/output interface receiving input from the intranet and transmitting output to the intranet, wherein the instructions stored in the memory are installed onto the self-contained device prior to installing the self-contained device to allow the self-contained device to crawl and index with the intranet through the input/output interface.

2. The self-contained device of claim 1, wherein the operator interface includes an exposed operator terminal and a monitor for outputting information to and receiving input from the device operator.

3. The self-contained device of claim 1, wherein the operator interface allows specification of at least one of a name of the self-contained device name, an IP address of the self-contained device, a list of servers within the intranet that is to be crawled and indexing parameters.

4. The self-contained device of claim 3, wherein the indexing parameters include indexing frequency and search parameters.

5. The self-contained device of claim 4, wherein the search parameters include information retrieval algorithm selection information.

6. The self-contained device of claim 3, wherein the operator interface uses an established Internet protocol.

7. The self-contained device of claim 1, wherein the input/output interface provides a communication medium between the self-contained device and the intranet.

8. The self-contained device of claim 1, further comprising a web server running on the server of the self-contained searchable indexing device, wherein the web server includes a form for entering a query and logic to process that query.

9. The self-contained searchable indexing device of claim 1, further comprising a mail indexer coupled to the input/output interface and indexing mail received via the input/output interface.

10. The self-contained searchable indexing device of claim 1, further comprising a large permanent memory device wherein an archive of all documents on the intranet is stored.

11. A method for installing a self-contained searchable indexing device for an intranet, the method comprising:

physically connecting the self-contained searchable indexing device, that includes instructions that allows automatic configuration of the device to enable the self-contained device to crawl and index an intranet to provide a searchable index of the content accessible through the intranet, without requiring information about the intranet configuration and administration, to the intranet through an input/output interface;

writing a cgi-script in a cgi-bin directory of a server of the intranet through the input/output interface;

connecting to the intranet by running a client script that is resident in a server of the intranet and connecting to the self-contained indexing device for search results; and setting search, index and device parameters in the self-contained searchable indexing device.

12. The method of claim 11, wherein the cgi-script is a custom cgi-script.

13. The method of claim 11, wherein the cgi-script is a pre-made sci-script.

14. The method of claim 11, wherein the self-contained searchable indexing device has a set Internet protocol address.

15. The method of claim 14, wherein the Internet protocol address is set by an operator setting the Internet protocol address via an operator interface during installation of the self-contained searchable indexing device into the intranet.

16. The method of claim 14, wherein the Internet protocol address is set by hard-coding the Internet protocol address into the self-contained searchable-indexing device prior to installation of the self-contained searchable indexing device into the intranet.

17. The method of claim 14, wherein the Internet protocol address is set automatically.

18. The method of claim 15, wherein the Intranet protocol address is set using DHCP or AutoIP.

19. A method for installing a self-contained searchable indexing device for an intranet, the method comprising:

physically connecting the self-contained searchable indexing device, that includes instructions that allows automatic configuration of the device to enable the self-contained device to crawl and index an intranet to provide a searchable index of the content accessible through the intranet, without requiring information about the intranet configuration and administration, to the intranet through an input/output interface;

writing a cgi-script in a cgi-bin directory of a server of the intranet through the input/output interface;

connecting to the intranet by installing a web server on a server in the self-contained searchable indexing device to handle searching and indexing requests for search results; and setting search, index and device parameters in the self-contained searchable indexing device.

* * * * *